United States Patent
Ayirala et al.

(10) Patent No.: US 10,954,764 B2
(45) Date of Patent: Mar. 23, 2021

(54) TAILORED INJECTION WATER SLUG DESIGNS FOR ENHANCED OIL RECOVERY IN CARBONATES

(71) Applicant: Saudi Arabian Oil Company, Dhahran (SA)

(72) Inventors: Subhash C. Ayirala, Dhahran (SA); Ammar AlShehri, Dhahran (SA); Sultan Enezi, Sammam (SA); Ali Al-Yousef, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 27 days.

(21) Appl. No.: 16/291,789

(22) Filed: Mar. 4, 2019

(65) Prior Publication Data
US 2020/0284130 A1 Sep. 10, 2020

(51) Int. Cl.
C09K 8/58 (2006.01)
E21B 43/20 (2006.01)

(52) U.S. Cl.
CPC .......... E21B 43/20 (2013.01); C09K 8/58 (2013.01)

(58) Field of Classification Search
CPC .......... E21B 43/20; E21B 43/16; C09K 8/58; C09K 8/84; C09K 8/60; C09K 8/601
See application file for complete search history.

(56) References Cited

U.S. PATENT DOCUMENTS

| | | | | |
|---|---|---|---|---|
| 7,987,907 B2 * | 8/2011 | Collins | ..................... | C09K 8/58 166/252.3 |
| 8,550,164 B2 * | 10/2013 | Al-Yousef | ............... | E21B 43/20 166/305.1 |
| 8,656,996 B2 | 2/2014 | Willingham et al. | | |
| 8,776,880 B2 * | 7/2014 | Pich | ....................... | C09K 8/588 166/268 |
| 9,404,033 B2 * | 8/2016 | Perry | ...................... | E21B 43/26 |
| 10,041,339 B2 * | 8/2018 | Jerauld | .................. | C09K 8/588 |

(Continued)

FOREIGN PATENT DOCUMENTS

WO 2017127522 A1 7/2017
WO 2019239200 A1 12/2019

OTHER PUBLICATIONS

International Search Report and Written Opinion for International Application No. PCT/US2020/021006 dated May 29, 2020; pp. 1-15.

(Continued)

*Primary Examiner* — Kenneth L Thompson
(74) *Attorney, Agent, or Firm* — Bracewell LLP; Constance G. Rhebergen; Brian H. Tompkins

(57) ABSTRACT

Provided are oil recovery compositions and processes for enhancing oil recovery from a carbonate reservoir. A process for enhancing oil recovery includes injecting a first slug of an aqueous solution having a salinity in the range of about 5,000 ppm TDS to about 7,000 ppm TDS and sulfate ions in the range of about 500 ppm to about 5000 ppm. After injection of the first slug, the process includes injecting a second slug of an aqueous solution having a salinity in the range of about 5,000 ppm TDS to about 7,000 ppm TDS, calcium ion concentrations in the range of about 100 ppm to about 1000 ppm, and magnesium ions in the range of about 200 ppm to about 2000 ppm. A third slug of seawater or produce water may then be injected as chase water.

18 Claims, 2 Drawing Sheets

(56) References Cited

U.S. PATENT DOCUMENTS

| | | |
|---|---|---|
| 10,106,726 B2 | 10/2018 | Ayirala et al. |
| 10,287,485 B2 | 5/2019 | Ayirala et al. |
| 10,287,486 B2 | 5/2019 | Ayirala et al. |
| 10,550,312 B2 | 2/2020 | Ayirala et al. |
| 10,590,329 B2 | 3/2020 | Ayirala et al. |
| 10,590,330 B2 | 3/2020 | Ayirala et al. |
| 10,723,937 B2 | 7/2020 | Ayirala et al. |
| 2011/0306525 A1 | 12/2011 | Lighthelm |
| 2015/0233223 A1 | 8/2015 | Alameri et al. |
| 2016/0009981 A1 | 1/2016 | Teklu et al. |
| 2016/0272873 A1 | 9/2016 | Mahadevan et al. |
| 2017/0044877 A1 | 2/2017 | Salino |
| 2017/0204323 A1 | 7/2017 | Ayirala et al. |
| 2018/0291717 A1 | 10/2018 | Ayirala et al. |
| 2018/0327650 A1 | 11/2018 | Yousef et al. |
| 2020/0115620 A1 | 4/2020 | Ayirala et al. |
| 2020/0172794 A1 | 6/2020 | Ayirala et al. |
| 2020/0224079 A1 | 7/2020 | Ayirala et al. |
| 2020/0270511 A1 | 8/2020 | Ayirala et al. |

OTHER PUBLICATIONS

Ayirala, Subhash C. et al.; "Microscopic scale interactions of water ions at crude oil/water interface and their impact on oil mobilization in advanced water flooding" Journal of Petroleum Science and Engineering 163 (2018), pp. 640-649.

Fathi, S. Jafar et al.; "Water-Based Enhanced Oil Recovery (EOR) by "Smart Water": Optimal Ionic Composition for EOR in Carbonates" Energy Fuels 2011, 25, pp. 5173-5179.

Yousef, Ali A. et al.; "Laboratory Investigation of the Impact of Injection-Water Salinity and Ionic Content on Oil Recovery From Carbonate Reservoirs" SPE 137634, SPE Reservoir Evaluation & Engineering, Oct. 2011, pp. 578-593.

* cited by examiner

TAILORED INJECTION WATER SLUG DESIGNS FOR ENHANCED OIL RECOVERY IN CARBONATES

BACKGROUND

Field of the Disclosure

The present disclosure generally relates to an oil recovery process and enhancing oil recovery from a reservoir.

Description of the Related Art

The use of improved oil recovery (also referred to as enhanced oil recovery (EOR)) processes has benefited the oil and gas industry by increasing the production of hydrocarbon bearing wells and fields. The EOR processes used in modern oil and gas operations may include chemical, gas, thermal, and microbial based processes. Water injection (alternatively referred to as water flooding) has been widely used to maintain reservoir pressures and displace hydrocarbon toward wells, thus increasing the production of liquid hydrocarbons in subterranean reservoir. Chemical EOR applications are water-based and use chemicals such as polymers, surfactants, alkalines, or combinations thereof dissolved in water and co-injected.

SUMMARY

Embodiments of the disclosure are directed to oil recovery compositions and processes for enhancing oil recovery from a carbonate reservoir. In particular, embodiments of the disclosure relate to an oil recovery process using an injection sequence of aqueous solution slugs having different ion concentrations.

In one embodiment, a method for enhancing oil recovery in a hydrocarbon containing carbonate reservoir is provided. The method includes injecting a first slug into the carbonate reservoir, the first slug having a first aqueous solution having a salinity of 5000 parts-per-million (ppm) total dissolved solids (TDS) to 7000 ppm TDS and consisting of sulfate ions and cations of a sulfate salt, the sulfate ions having a concentration in the range of 500 ppm to 5000 ppm. The method also includes injecting, after the first slug, a second slug into the carbonate reservoir, the second slug having a second aqueous solution having a salinity of 5000 ppm to 7000 ppm and consisting of magnesium ions, anions of a magnesium salt, calcium ions, and anions of a calcium salt, the magnesium ions having a concentration in the range of 200 ppm to 2000 ppm, and the calcium ions having a concentration in the range of 100 ppm to 1000 ppm.

In some embodiments, the method includes injecting, after the second slug, a third slug that includes seawater into the carbonate reservoir. In some embodiments, the method includes injecting, after the second slug, a third slug that includes produced water into the carbonate reservoir. In some embodiments, the method includes recovering displaced hydrocarbons from the carbonate reservoir via one or more producing wells. In some embodiments, the third slug has a pore volume in the range of 0.5 to 1.0. In some embodiments, the first slug has a pore volume in the range of 0.3 to 0.5. In some embodiments, the second slug has a pore volume in the range of 0.3 to 0.5. In some embodiments, the cations of a sulfate salt include sodium ions. In some embodiments, the anions of a magnesium salt include chloride ions, and the anions of a calcium salt include chloride ions.

In another embodiment, an oil recovery composition is provided. The oil recovery composition includes a first aqueous solution having a salinity of 5000 parts-per-million (ppm) total dissolved solids (TDS) to 7000 ppm TDS and consisting of sulfate ions and cations of a sulfate salt, the sulfate ions having a concentration in the range of 500 ppm to 5000 ppm. The oil recovery composition also includes a second aqueous solution having a salinity of 5000 ppm to 7000 ppm and consisting of magnesium ions, anions of a magnesium salt, calcium ions, and anions of a calcium salt, the magnesium ions having a concentration in the range of 200 ppm to 2000 ppm and the calcium ions having a concentration in the range of 100 ppm to 1000 ppm. In some embodiments, the cations of a sulfate salt include sodium ions. In some embodiments, the anions of the magnesium salt include chloride ions, and the anions of the calcium salt include chloride ions. In some embodiments, the anions of the magnesium salt and the anions of the calcium salt are different anions.

In another embodiment, a method for enhancing oil recovery in a hydrocarbon containing carbonate reservoir is provided. The method includes injecting a first slug into the carbonate reservoir, the first slug having a first aqueous solution having a salinity of 5000 parts-per-million (ppm) total dissolved solids (TDS) to 7000 ppm TDS and consisting of sulfate ions sodium ions, the sulfate ions having a concentration in the range of 500 ppm to 5000 ppm. The method includes injecting a second slug, after the first slug, into the carbonate reservoir, the second slug having a second aqueous solution having a salinity of 5000 ppm to 7000 ppm and consisting of magnesium ions, calcium ions, and chloride ions, the magnesium ions having a concentration in the range of 200 ppm to 2000 ppm and the calcium ions having a concentration in the range of 100 ppm to 1000 ppm. The method further includes injecting, after the second slug, a third slug that includes seawater or produced water into the carbonate reservoir. In some embodiments, the method includes recovering displaced hydrocarbons from the carbonate reservoir via one or more producing wells. In some embodiments, the first slug has a pore volume in the range of 0.3 to 0.5. In some embodiments, the second slug has a pore volume in the range of 0.3 to 0.5. In some embodiments, the third slug has a pore volume in the range of 0.5 to 1.0.

DETAILED DESCRIPTION

Figure 1:
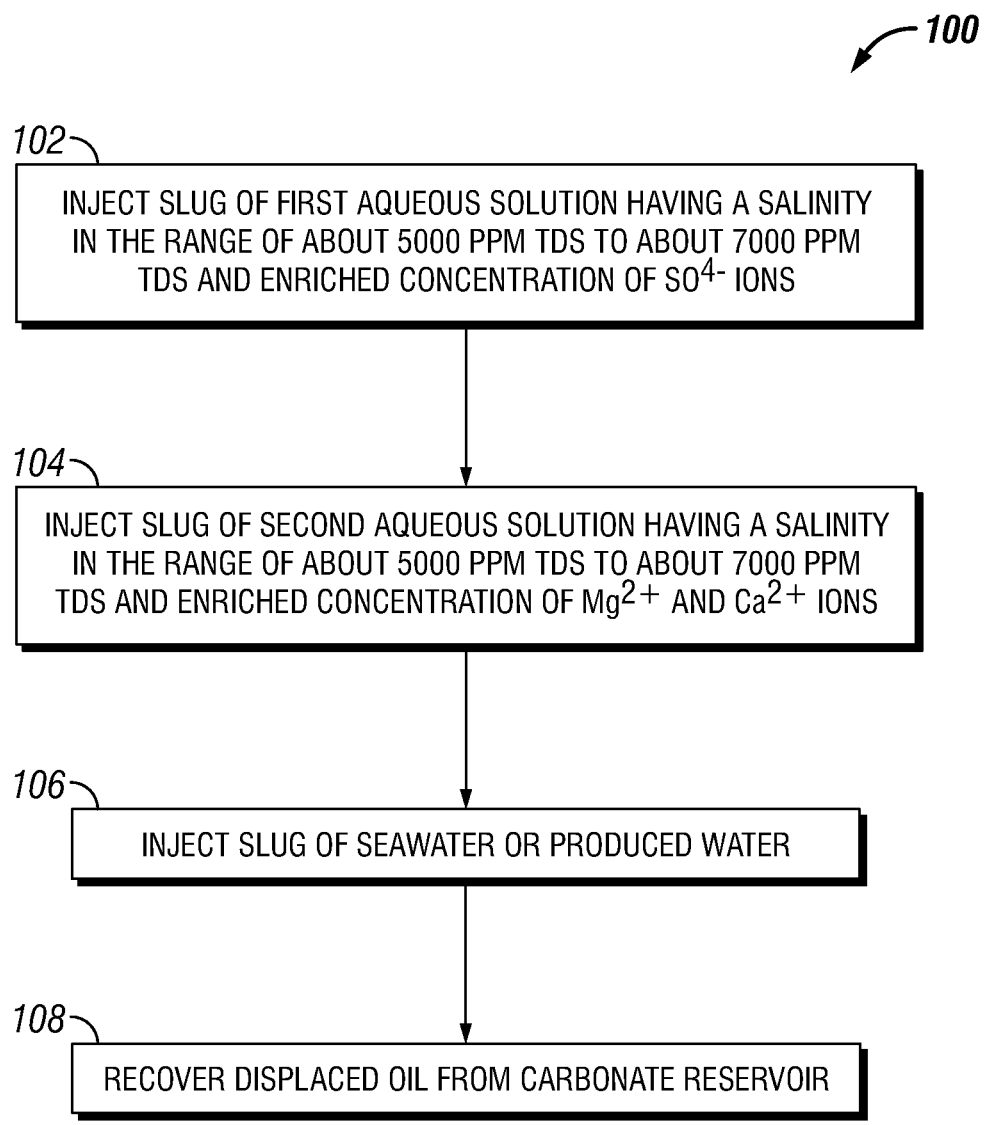
FIG. 1 is block diagram of a process for enhancing oil recovery from a reservoir using a sequence (for example, an injection sequence) of sulfate ions followed by magnesium and calcium ions in accordance with an embodiment of the disclosure.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include oil recovery compositions and processes for enhancing oil recovery from a carbonate reservoir. The oil recovery compositions and processes described in this disclosure may improve oil recovery from a reservoir as compared to conventional enhanced oil recovery compositions. In some embodiments, the compositions and processes described in the disclosure may be particularly suitable for maximizing oil recovery in carbonate reservoirs.

An oil recovery composition may include a first aqueous solution and a second aqueous solution. In some embodiments, a first aqueous solution for use in enhancing oil recovery has a sulfate ion concentration in the range of about 500 parts-per-million mass (ppm) to about 5000 ppm. The first aqueous solution has a salinity in the range of about 5,000 ppm total dissolved solids (TDS) to about 7,000 ppm TDS. As described in the disclosure, the sulfate ions of the first aqueous solution may alter the surface charge at the reservoir rock surface to shift the wettability towards the water-wet side and improve the release of more oil.

In some embodiments, the first aqueous solution does not include any magnesium ions and calcium ions (that is, a zero concentration of magnesium ions and calcium ions). In some embodiments, the first aqueous solution does not include any divalent cations. In some embodiments, the first aqueous solution only includes sulfate ions and a cation of a sulfate salt, such that the first aqueous solution consists of sulfate ions and a cation of a sulfate salt. The first aqueous solution may be formed by the addition of a sulfate salt to water (for example, freshwater such as desalinated seawater from a reverse osmosis process) to achieve a sulfate ion concentration in the range of about 500 ppm to about 5000 ppm. For example, in some embodiments, the sulfate salt may be sodium sulfate. In such embodiments, the first aqueous solution only includes sulfate ions and sodium ions, such that the first aqueous solution consists of sulfate ions and sodium ions. In other embodiments, other sulfate salts may be used. In some embodiments, water for the first aqueous solution may be sourced from aquifer water, treated seawater, or produced water. In other embodiments the first aqueous solution may be directly obtained as a diluted reject stream from the treatment of seawater by a nanofiltration (NF) based sulfate removal unit.

In some embodiments, a second aqueous solution has a calcium ion concentration in the range of about 100 ppm to about 1000 ppm and a magnesium ion concentration in the range of about 200 ppm to about 2000 ppm. The second aqueous solution has a salinity in the range of about 5,000 ppm TDS to about 7,000 ppm TDS. As described in the disclosure, the magnesium ions and calcium ions of the second aqueous solution promote the coalescence of released oil droplets (that is, released by the first aqueous solution) and enable faster mobilization of the oil to form the oil bank for efficient recovery from the reservoir.

In some embodiments, the second aqueous solution does not include any sulfate ions (that is, a zero concentration of sulfate ions). In some embodiments, the second aqueous solution does not include any divalent anions. In some embodiments, the second aqueous solution includes calcium ions, an anion of a calcium salt, magnesium ions, and an anion of a magnesium salt, such that the second aqueous solution consists of calcium ions, an anion of a calcium salt, magnesium ions, and an anion of a magnesium salt (the anion of a calcium salt and the anion of a magnesium salt may be the same ion). The second aqueous solution may be formed by the addition of a calcium salt to water to achieve a calcium ion concentration in the range of about 100 ppm to about 1000 ppm and the addition of a magnesium salt to water to achieve a magnesium ion concentration in the range of about 200 ppm to about 2000 ppm. For example, in some embodiments, the calcium salt may be calcium chloride and the magnesium salt may be magnesium chloride. In such embodiments, the second aqueous solution may only include calcium ions, magnesium ions, and chloride ions, such that the second aqueous solution consists of magnesium ions, calcium ions, and chloride ions. In other embodiments, other calcium salts and magnesium salts may be used. In some embodiments, water for the second aqueous solution may be sourced from aquifer water, treated seawater, or produced water.

FIG. 1 depicts a process 100 for enhancing oil recovery from a reservoir using a sequence (for example, an injection sequence) of sulfate ions followed by magnesium and calcium ions in accordance with an embodiment of the disclosure. In some embodiments, the reservoir is a carbonate reservoir. Initially, a slug of a first aqueous solution having a salinity in the range of about 5,000 ppm TDS to about 7,000 ppm TDS and having sulfate ions in the range of about 500 ppm to about 5000 ppm may be injected or otherwise introduced into a reservoir (block 102). In some embodiments, the slug of the first aqueous solution does not include any magnesium ions and calcium ions (that is, a zero concentration of magnesium ions and calcium ions). In some embodiments, the first aqueous solution only includes sulfate ions and a cation of a sulfate salt, such that the first aqueous solution consists of sulfate ions and a cation of a sulfate salt. In some embodiments, the first aqueous solution consists of sulfate ions and sodium ions. In some embodiments, the first slug may have a pore volume (PV) in the range of about 0.3 to about 0.5. The first slug may enable the interaction of sulfate ions at the rock-fluids interface and alter the wettability for releasing oil from surfaces of the rock in the reservoir.

Next, a slug of a second aqueous solution having a salinity in the range of about 5,000 ppm TDS to about 7,000 ppm TDS, a calcium ion concentration in the range of about 100 ppm to about 1000 ppm, and a magnesium ion concentration in the range of about 200 ppm to about 2000 ppm may be injected or otherwise introduced into a reservoir (block 104). In some embodiments, the second aqueous solution only includes calcium ions, an anion of a calcium salt, magnesium ions, and an anion of a magnesium salt, such that the slug of the second aqueous solution consists of calcium ions, an anion of a calcium salt, magnesium ions, and an anion of a magnesium salt (the anion of a calcium salt and the anion of a magnesium salt may be the same anion). In some embodiments, the second aqueous solution consists of magnesium ions, calcium ions, and chloride ions. In some embodiments, the second slug may have a pore volume (PV) in the range of about 0.3 to about 0.5. As discussed in the disclosure, the magnesium and calcium ions in the second slug may promote coalescence between released oil droplets and enable faster mobilization of the oil to form the oil bank for recovery.

After injection of the first slug and second slug, a slug of seawater (for example, seawater having a salinity in the range of about 35,000 ppm TDS to about 60,000 ppm TDS) or produced water (for example, produced water having a salinity in the range of about 35,000 ppm TDS to about 100,000 ppm TDS) may be injected as chase water (block 106) to push the mobilized oil and the formed oil bank towards one or more producing wells. In some embodiments, the seawater or produced water slug may have a pore volume (PV) in the range of about 0.5 to about 1.0. Finally, displaced oil may be recovered from the reservoir formation (block 108), such as via one or more producing wells.

The oil recovery composition and sequential injection of the slug of the first aqueous solution and the slug of the second aqueous solution is distinguishable over a continuous injection of an aqueous solution having some or all of the same ions, or a single slug having the some or all of the same ions, as a continuous injection or single slug injection would fail to provide the improvements described in the disclosure. The oil recovery compositions and processes described in the disclosure may improve existing water flooding processes and maximize oil recovery achieved through such processes. The oil recovery compositions and processes described in the disclosure may also enable a relatively fast oil bank formation (as compared to conventional water flooding) in the reservoir for decreased water cut in production streams.

Examples

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting examples of low salinity (that is, a salinity in the range of 5,000 to 7,000 ppm TDS) waters having magnesium, calcium, or sulfate ions were tested and compared by determining the contact angle and the times required to achieve the complete coalescence between crude oil droplets.

Three low salinity water solutions were prepared and tested. Each solution was composed of a single type of salt at a fixed salinity of 5761 ppm TDS. Solution 1 was composed of magnesium chloride ($MgCl_2$), Solution 2 was composed of calcium chloride ($CaCl_2$)), and Solution 3 was composed of sodium sulfate ($Na_2SO_4$). The pH and ion concentration of each solution is shown in Table 1:

TABLE 1

PH, COMPOSITION, AND SALINITY
OF EXAMPLE LOW SALINITY WATER

| Solution No. | pH | Cations | | | Anions | | TDS (ppm) |
|---|---|---|---|---|---|---|---|
| | | $Na^+$ (ppm) | $Mg^{2+}$ (ppm) | $Ca^{2+}$ (ppm) | $SO_4^{2+}$ (ppm) | $Cl^-$ (ppm) | |
| Solution 1 | 6.32 | 0 | 1471 | 0 | 0 | 4290 | 5761 |
| Solution 2 | 6.05 | 0 | 0 | 2080 | 0 | 3681 | 5761 |
| Solution 3 | 6.27 | 1865 | 0 | 0 | 3896 | 0 | 5761 |

Deionized (DI) water was used in the experiments to establish a baseline for comparison.

The contact angle (as an indicator of wettability to impact oil release from the rock surface) and crude oil droplet coalescence times (as an indicator to impact the connectivity of released oil to form the oil bank) were measured at room temperature to evaluate the impact of the divalent ions $Ca^{2+}$, $Mg^{2+}$, and $SO_4^{2-}$ at rock-fluid and fluid-fluid interfaces, respectively. Carbonate rock surfaces were used for contact angle measurements, and crude oil obtained from the same carbonate reservoir used as the fluid had a viscosity of about 6.0 centipoise (cP) at ambient conditions.

Figure 2:
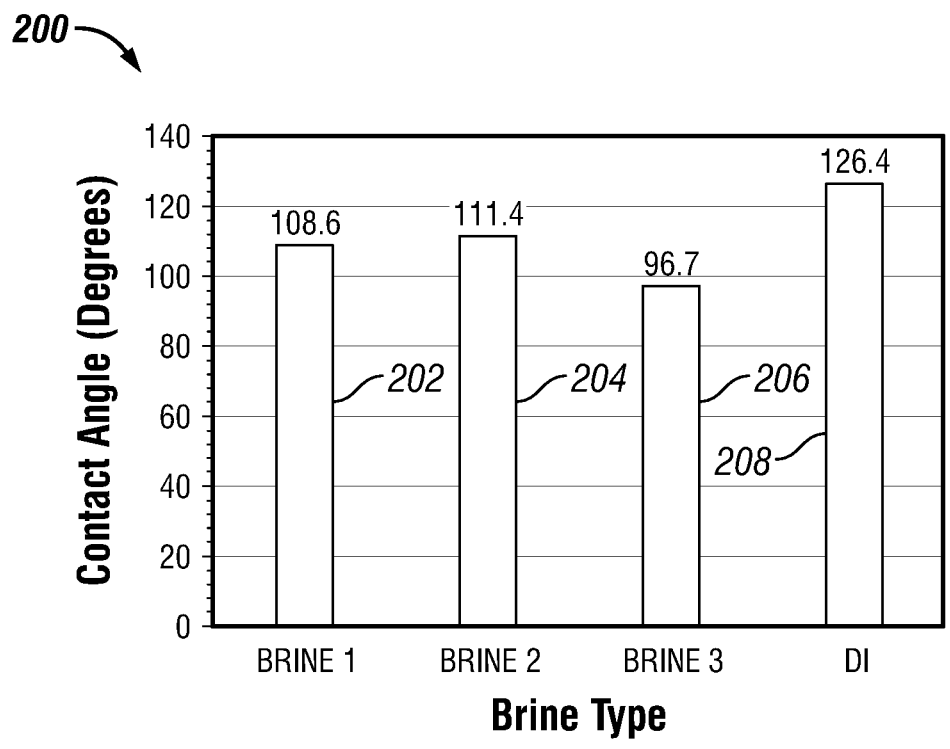
FIG. 2 is a bar graph depicting the contact angle (in degrees) versus solution type for example solutions in accordance with an embodiment of the disclosure.

The contact angle results obtained for each solution and the deionized water is shown in FIG. 2. FIG. 2 is a bar graph 200 depicting the contact angle (in degrees) on the y-axis and the solution type on the x-axis. As shown by bar 202 in FIG. 2, Solution 1 (magnesium ions) had a contact angle of 108.6°. As shown by bar 204, Solution 2 (calcium ions) had a contact angle of 111.4°. As shown by bar 206, Solution 3 (sulfate ions) had a contact angle of 96.7°. The deionized water is shown by bar 208 in FIG. 2 and had a contact angle of 126.4°.

Typically the contact angle of a water-wet system is between 0° to 75°, while that of an oil-wet system is between 105° to 180°. As shown by the results in FIG. 2, Solution 3 containing sulfate ions favorably altered the surface charge at the carbonate surface to shift the wettability towards the water-wet side. This condition may be beneficial for detaching oil from carbonate surface. In contrast, Solutions 1 and 2 containing magnesium and calcium respectively and the DI water retained the oil-wet tendency for the carbonate surface, a condition which hinders the release of oil due to the strong adhesion with the rock surface.

Figure 3:
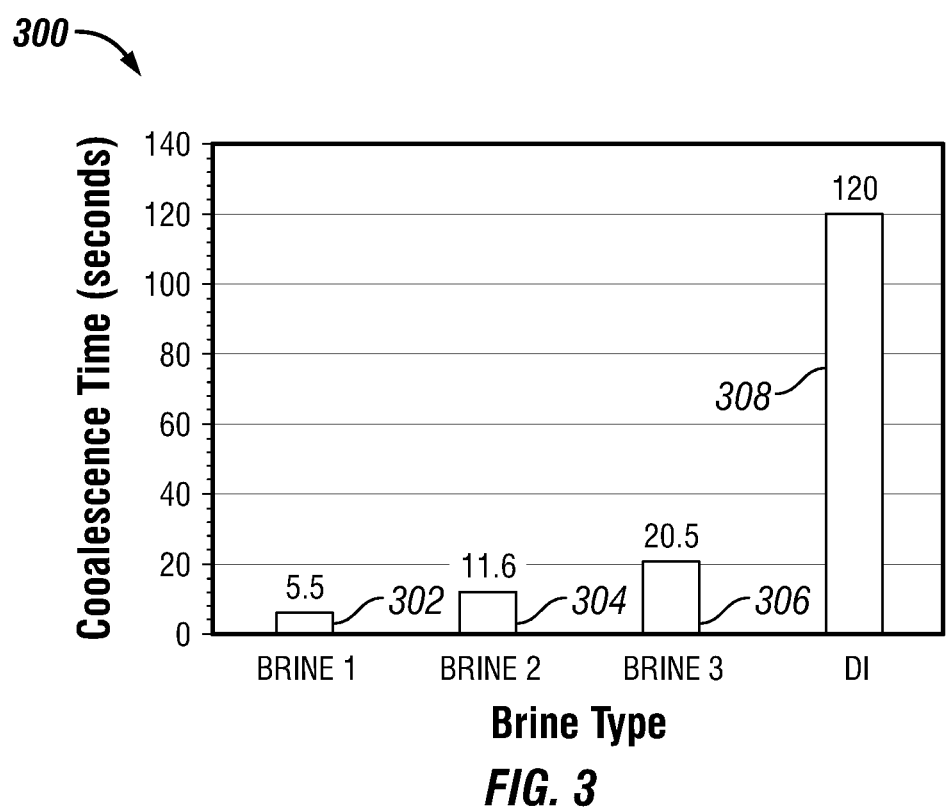
FIG. 3 is a bar graph depicting the coalescence time (in seconds) versus solution type for example solutions in accordance with an embodiment of the disclosure.

The crude oil droplets coalescence time results obtained for each solution and the deionized water is shown in FIG. 3. FIG. 3 is a bar graph 300 depicting the coalescence time (in seconds) on the y-axis and the solution type on the x-axis. As shown by bar 302 in FIG. 3, Solution 1 (magnesium ions) had a coalescence time of 5.5 seconds. As shown by bar 304, Solution 2 (calcium ions) had a coalescence time of 11.6 seconds. As shown by bar 306, Solution 3 (sulfate ions) had a coalescence time of 20.5 seconds. The deionized water is shown by bar 308 in FIG. 3 and had a coalescence time of 120 seconds.

As shown by the results depicted in FIG. 3, the crude oil droplet coalescence times are significantly less in Solution 1 containing magnesium ions and Solution 2 containing calcium ions. In contrast, significantly greater oil droplet coalescence times were observed for Solution 3 containing sulfate ions and DI water. Thus, the results demonstrate the favorable effects of magnesium and calcium ions to quickly mobilize released oil by promoting oil droplets coalescence and form the oil bank for EOR operations.

Ranges may be expressed in the disclosure as from about one particular value to about another particular value or both. When such a range is expressed, it is to be understood that another embodiment is from the one particular value to the other particular value or both along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method for enhancing oil recovery in a hydrocarbon containing carbonate reservoir, comprising:
    injecting a first slug into the carbonate reservoir, the first slug comprising a first aqueous solution having a salinity of 5000 parts-per-million (ppm) total dissolved solids (TDS) to 7000 ppm TDS and consisting of sulfate ions and cations of a sulfate salt, the sulfate ions having a concentration in the range of 500 ppm to 5000 ppm; and
    injecting, after the first slug, a second slug into the carbonate reservoir, the second slug comprising a second aqueous solution having a salinity of 5000 ppm to 7000 ppm and consisting of magnesium ions, anions of a magnesium salt, calcium ions, and anions of a calcium salt, the magnesium ions having a concentration in the range of 200 ppm to 2000 ppm, and the calcium ions having a concentration in the range of 100 ppm to 1000 ppm.

2. The method of claim 1, comprising injecting, after the second slug, a third slug comprising seawater into the carbonate reservoir.

3. The method of claim 2, comprising recovering displaced hydrocarbons from the carbonate reservoir via one or more producing wells.

4. The method of claim 2, wherein the third slug has a pore volume in the range of 0.5 to 1.0.

5. The method of claim 1, comprising injecting, after the second slug, a third slug comprising produced water into the carbonate reservoir.

6. The method of claim 1, wherein the first slug has a pore volume in the range of 0.3 to 0.5.

7. The method of claim 1, wherein the second slug has a pore volume in the range of 0.3 to 0.5.

8. The method of claim 1, wherein the cations of a sulfate salt comprise sodium ions.

9. The method of claim 1, wherein the anions of a magnesium salt comprise chloride ions, and the anions of a calcium salt comprise chloride ions.

10. An oil recovery composition, comprising:
    a first aqueous solution having a salinity of 5000 parts-per-million (ppm) total dissolved solids (TDS) to 7000 ppm TDS and consisting of sulfate ions and cations of a sulfate salt, the sulfate ions having a concentration in the range of 500 ppm to 5000 ppm; and
    a second aqueous solution having a salinity of 5000 ppm to 7000 ppm and consisting of magnesium ions, anions of a magnesium salt, calcium ions, and anions of a calcium salt, the magnesium ions having a concentration in the range of 200 ppm to 2000 ppm and the calcium ions having a concentration in the range of 100 ppm to 1000 ppm.

11. The composition of claim 10, wherein the cations of a sulfate salt comprise sodium ions.

12. The composition of claim 10, wherein the anions of the magnesium salt comprise chloride ions, and the anions of the calcium salt comprise chloride ions.

13. The composition of claim 10, wherein the anions of the magnesium salt and the anions of the calcium salt are different anions.

14. A method for enhancing oil recovery in a hydrocarbon containing carbonate reservoir, comprising:
    injecting a first slug into the carbonate reservoir, the first slug comprising a first aqueous solution having a salinity of 5000 parts-per-million (ppm) total dissolved solids (TDS) to 7000 ppm TDS and consisting of sulfate ions sodium ions, the sulfate ions having a concentration in the range of 500 ppm to 5000 ppm;
    injecting a second slug, after the first slug, into the carbonate reservoir, the second slug comprising a second aqueous solution having a salinity of 5000 ppm to 7000 ppm and consisting of magnesium ions, calcium ions, and chloride ions the magnesium ions having a concentration in the range of 200 ppm to 2000 ppm, and the calcium ions having a concentration in the range of 100 ppm to 1000 ppm and;
    injecting, after the second slug, a third slug comprising seawater or produced water into the carbonate reservoir.

15. The method of claim 14, comprising recovering displaced hydrocarbons from the carbonate reservoir via one or more producing wells.

16. The method of claim 14, wherein the first slug has a pore volume in the range of 0.3 to 0.5.

17. The method of claim 14, wherein the second slug has a pore volume in the range of 0.3 to 0.5.

18. The method of claim 14, wherein the third slug has a pore volume in the range of 0.5 to 1.0.

* * * * *